UNITED STATES PATENT OFFICE.

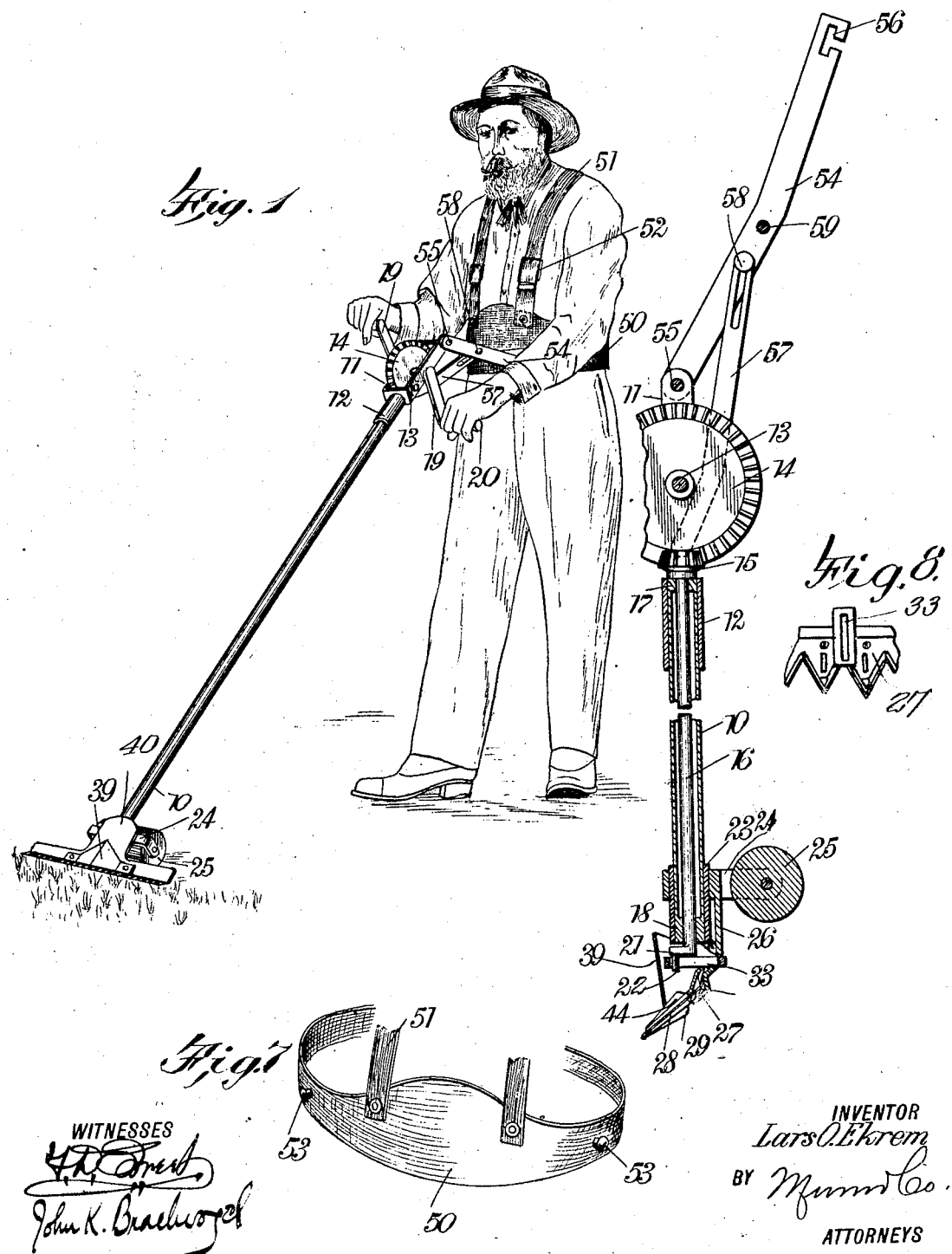

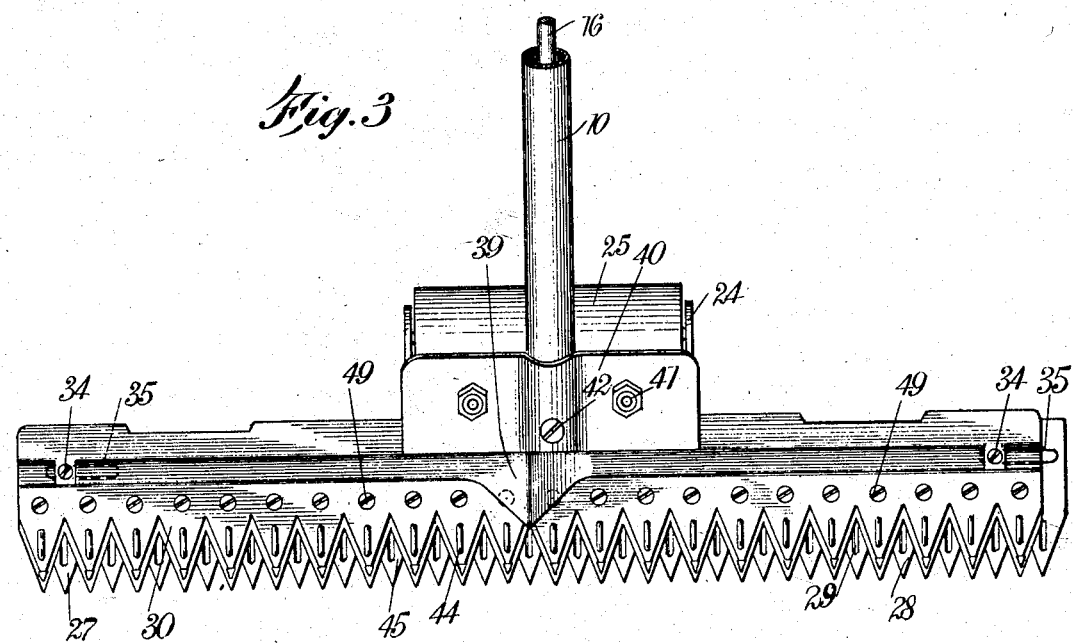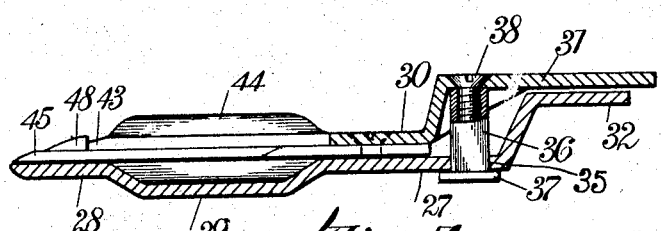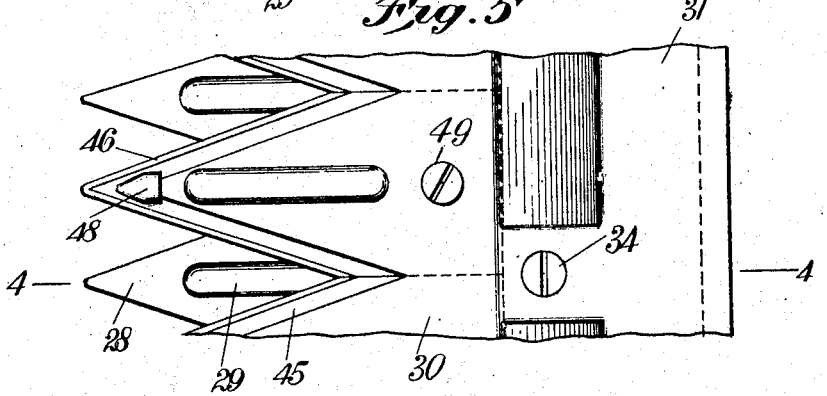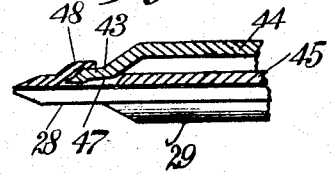

LARS OLSEN EKREM, OF COPPER CITY, MICHIGAN.

MOWER.

1,027,190.

Specification of Letters Patent.  Patented May 21, 1912.

Application filed June 21, 1911. Serial No. 634,416.

*To all whom it may concern:*

Be it known that I, LARS O. EKREM, a subject of the King of Norway, and a resident of Copper City, in the county of Houghton and State of Michigan, have invented a new and Improved Mower, of which the following is a full, clear, and exact description.

This invention relates to mowers for mowing lawns, and for other like purposes, and has reference more particularly to the combination of a mower having means whereby it can be manually operated, with means for supporting the mower upon the person of the operator, so that both hands of the operator are left free for use in manipulating the mower operating mechanism.

The invention also relates to a mower which has a cutter bar, a movable knife carrier, and a plurality of removable, interchangeable knife or cutting elements secured to the carrier.

The object of the invention is to provide a simple, strong and durable mower for cutting the grass of lawns, for trimming the edges of walks, and for other, similar purposes, which is compact in form and light in weight, which can be manipulated with ease and facility, which has associated therewith means for partly supporting it upon the person of the operator, so that both hands of the operator are left free for use in manipulating the mower, which can be easily guided when in use, and which is so constructed that the different elements of the cutting mechanism can be removed or replaced when necessary, without disturbing the remaining elements.

The invention consists in the construction and combination of parts to be more fully described hereinafter and particularly set forth in the claims.

Reference is to be had to the accompanying drawings forming a part of this specification, in which similar characters of reference indicate corresponding parts in all the views, and in which—

Figure 1 is a perspective view of an embodiment of my invention showing the same in use; Fig. 2 is an enlarged, longitudinal section of the mower, parts being broken away; Fig. 3 is an enlarged plan view of the cutting mechanism of the mower; Fig. 4 is a transverse section on the line 4—4 of Fig. 5; Fig. 5 is an enlarged, fragmentary plan view of a part of the cutting mechanism; Fig. 6 is a fragmentary section showing certain of the details of construction of the cutter bar, the knife carrier, and a knife; Fig. 7 is a fragmentary, perspective view showing part of a suitable device for permitting the operation of the mower; and Fig. 8 is a fragmentary plan view of part of the mowing mechanism, showing certain constructive details.

Before proceeding to a more detailed explanation of my invention it should be clearly understood that while the mower is particularly useful in trimming lawns, it can also be advantageously employed for other purposes, and for cutting vegetation other than grass.

The cutting mechanism proper, of my mower, is similar in appearance to that of the ordinary reciprocating knife mower. I have however, found it advisable to modify this construction, so that the knives themselves consist of independent elements which can be removed and replaced one at a time, as necessary.

Certain of the details of construction, shown for example herewith, form no part of the invention, and can be varied in accordance with individual preference and special conditions, without deviating from the essence of the invention as defined in the appended claims.

Referring more particularly to the drawings, I provide a post or body 10, of elongated, tubular form, with which is associated at the upper end a bifurcated member 11 having a sleeve 12 which receives the upper end of the body 10, and by means of which it is secured thereto. Between the sides of the fork 11 is journaled a spindle 13 having thereon a bevel gear 14 in mesh with a bevel pinion 15 secured rigidly upon the upper projecting end of a driving shaft 16 located within the tubular body 10 and journaled in bearings 17 and 18 provided respectively at the upper and lower ends of the body. At the extremities of the spindle 13 are secured hand cranks 19 positioned 180° apart, and having grips 20 by means of which they can be easily manipulated. At the lower end, the shaft 16 has a crank arm 21 provided with a stud 22 for a purpose which will appear hereinafter.

At the lower end of the tubular body is secured a sleeve 23 having a fork bracket 24 mounted thereon, between the sides of which is journaled a roller 25 which movably supports the lower part of the device on the ground. The bracket 24 at the under side of the body has a longitudinal extension 26 to which is secured the cutter bar 27 of the cutting mechanism. The cutter bar has the length thereof arranged transversely of the length of the body and is angularly disposed with respect thereto, so that when the body is arranged at an angle with the horizontal, the plane of the cutter bar itself is substantially level with the ground. The cutter bar is of the usual, serrated construction, and has the teeth 28 thereof provided with downwardly disposed ribs or depressions 29, which are designed to lend strength and rigidity to the bar.

Slidably mounted upon the cutter bar is a knife carrier 30, likewise provided with teeth, and having the rear portion 31 upwardly offset to correspond to the similarly offset rear portion 32 of the cutter bar. The knife carrier is movable transversely of the length of the body 10, and is provided with a slotted extension 33 which receives the stud 22 of the crank arm 21, so that as the shaft 16 is revolved, the knife carrier will be reciprocated. The knife carrier has secured thereto the cutting blades, as will be described more particularly hereinafter.

To guide the carrier in its reciprocating motion I provide a plurality of guide bolts 34, which are received in guide slots 35 of the cutter bar, and thus permit a limited movement of the cutter carrier in the direction of its length, and constrain the carrier to move in juxtaposition with the cutter bar and in the direction of the length of the same, also preventing twisting or distortion of the parts. The guide bolts comprise hollow, threaded sleeves 36 having heads 37 engaging under the cutter bar, and arranged to receive countersunk screws 38 extending through suitable openings of the carrier. The sleeves it will be understood, are located in the slots 35. The construction of the guide devices is shown most clearly in Fig. 4. The cutter carrier, near the center, has a V-shaped, upwardly disposed part 39, which extends over the slotted extension 33 and the crank 21 of the shaft 16, and prevents the entrance of grass or other material which would tend to collect in the mechanism. A guard shield 40 extends rearwardly and upwardly from under the part 39 of the carrier, and serves a like purpose. It is secured in place upon the bracket 24, by means of bolts 41. A set screw 42 holds it with respect to the tubular body 10.

The knife carrier is of serrated form, and at the end of each of its teeth has a downwardly offset point 43. The teeth are provided with longitudinal offsets or ribs 44 for the purpose of lending to them strength and rigidity. The knives or blades 45 have the forward portions tapered and provided with the cutting edges 46. Each knife, near its point, has an opening 47 and an upward, offset or socket 48 in which is received the point 43 of one of the carrier serrations. Each blade is secured in position additionally, by means of a set-screw 49. The parallel edges of the adjacent blades are in juxtaposition, as is indicated in dotted outline in Fig. 5. The edges of the blades project beyond the corresponding edges of the carrier teeth, and coöperate with the edges of the cutter bar teeth in shearing through the grass or other vegetation to be severed.

I employ with my mower a suitable device for supporting it upon the body of the operator. This device comprises, preferably, a belt 50 including a fabric cover, and a suitably bent, metal plate adapted to encompass the waist of the operator, and supported by means of suspender or like straps 51 passing over the shoulders and provided with buckles 52. At the opposite sides of the belt are located studs or projections 53 having enlarged heads. Supporting arms 54, which are preferably slightly bent, are adjustably secured at the extremities of the sides of the fork 11 by means of a cross bolt 55. Each arm 54 has at the end, a bayonet or like slot 56, by means of which it can be attached at one of the studs 53. Slotted retaining bars 57 are secured to the bracket 11, near the end of the body 10, and receive bolts 58 in the slots thereof, the bolts being carried by the arms 54 intermediate their ends. The arms 54 are connected by a cross bar 59. By means of the slotted retaining bars 57 and the bolts 58, the arms 54 can be secured in different, adjusted, relative positions.

When the mower is in use, it is supported upon the body of the operator, by means of the belt 50, which receives the arms 54, these having first been angularly adjusted to adapt the device to the height of the operator. The lower end of the mower is supported by means of its roller 25, upon the ground, and can be easily advanced along the same as the operator walks, both hands of the operator being free to actuate the cranks 19. As the shaft 16 is rotated, the cutter carrier is reciprocated, and the cutting device thus becomes operative to sever the grass.

Having thus described my invention, I claim as new, and desire to secure by Letters Patent:—

1. In a mower, a cutter bar, a movable knife carrier, and a plurality of removable, interchangeable knives secured to said carrier, said cutter bar and said knife carrier having teeth, said knives being of tapered form corresponding to said teeth.

2. In a mower, a cutter bar, a movable knife carrier having offset points, and a plurality of removable, interchangeable knives secured to said carrier and each having a socket adapted to receive one of said offset points.

3. In a mower, a cutter bar having teeth, a movable knife carrier having teeth each having the point offset, and a plurality of removable, interchangeable knives of tapered form, each having an opening and an offset forming a socket adapted to receive one of said points of said carrier.

4. In a mower, a cutter bar having teeth, a movable knife carrier having teeth each having the point offset, a plurality of removable, interchangeable knives of tapered form, each having an opening and an offset forming a socket adapted to receive one of said points of said carrier, and a set-screw for securing each of said knives in position, said cutter bar and said carrier having strengthening ribs.

In testimony whereof I have signed my name to this specification in the presence of two subscribing witnesses.

LARS OLSEN EKREM.

Witnesses:
GEORGE NORDSTROM,
ANTON ANDERSON.